United States Patent
Takahashi et al.

(10) Patent No.: US 9,760,188 B2
(45) Date of Patent: Sep. 12, 2017

(54) POSITION INDICATOR

(71) Applicant: Brother Kogyo Kabushiki Kaisha, Nagoya-shi, Aichi-ken (JP)

(72) Inventors: Ryoya Takahashi, Gifu (JP); Takehiko Inaba, Chita-gun (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 292 days.

(21) Appl. No.: 14/661,544

(22) Filed: Mar. 18, 2015

(65) Prior Publication Data
US 2015/0324019 A1 Nov. 12, 2015

(30) Foreign Application Priority Data
May 7, 2014 (JP) .................... 2014-095833

(51) Int. Cl.
*G06F 3/0354* (2013.01)
*G06F 3/046* (2006.01)

(52) U.S. Cl.
CPC .......... *G06F 3/03545* (2013.01); *G06F 3/046* (2013.01); *G06F 2203/0334* (2013.01)

(58) Field of Classification Search
CPC ............. G06F 3/03545; G06F 3/03546; G06F 2203/0334
See application file for complete search history.

(56) References Cited

U.S. PATENT DOCUMENTS

| | | | | | |
|---|---|---|---|---|---|
| 4,268,730 | A | * | 5/1981 | Higgins | G06F 3/03545 178/19.04 |
| 5,541,375 | A | * | 7/1996 | Dam | G06F 3/03545 178/19.01 |
| 2008/0166175 | A1 | * | 7/2008 | Pittel | B43K 23/001 401/195 |
| 2009/0114459 | A1 | * | 5/2009 | Fukushima | G06F 3/03545 178/19.03 |
| 2010/0021022 | A1 | * | 1/2010 | Pittel | G06F 3/03545 382/123 |
| 2011/0219892 | A1 | * | 9/2011 | Fukushima | G06F 3/03545 73/865.4 |

(Continued)

FOREIGN PATENT DOCUMENTS

| | | |
|---|---|---|
| JP | S63157221 A | 6/1988 |
| JP | 2006-163652 A | 6/2006 |
| JP | 2012-173833 A | 9/2012 |

*Primary Examiner* — David Tung
(74) *Attorney, Agent, or Firm* — Banner & Witcoff, Ltd.

(57) ABSTRACT

A position indicator includes a cylindrical case, a signal output device, a core body portion, an urging device, a substrate, a plurality of flat springs, and a conduction member. The signal output device is in the case and outputs a detection signal to a position detection device. The core body portion is provided to be freely movable inside the case along an axial direction. The urging device urges the core body portion toward one end side of the case. The substrate includes a circuit connected to the signal output device, and extends in a direction parallel with the axial direction. The flat springs have elasticity in the axial direction, protrude from the substrate toward the core body portion while making contact with the end surface. The conduction member causes the flat springs to become conductive to each other by moving to a position of contact with the flat springs.

9 Claims, 12 Drawing Sheets

(56) References Cited

U.S. PATENT DOCUMENTS

| | | | |
|---|---|---|---|
| 2013/0241897 A1* | 9/2013 | Fukushima | G06F 3/046 345/179 |
| 2014/0029156 A1* | 1/2014 | Obata | G06F 3/03545 361/270 |
| 2015/0116287 A1* | 4/2015 | Yeh | B43K 8/003 345/179 |

* cited by examiner

POSITION INDICATOR

CROSS-REFERENCE TO RELATED APPLICATION

This Application claims priority to Japanese Patent Application No. 2014-095833 filed May 7, 2014, the content of which is hereby incorporated by reference.

BACKGROUND

The present disclosure relates to a position indicator.

Electronic writing devices have been known into which an operator can electronically input handwritten content. In such an electronic writing device, the operator writes a desired character string etc. on a writing surface of an object to be written on, using an electronic writing instrument, such as an electronic pen. While the writing is performed, writing signals are transmitted from the electronic writing instrument. The transmitted writing signals are received by a coil arranged on a back surface of the object to be written on. This operation generates writing data based on temporal changes of positional information corresponding to the writing operation on the writing surface. The generated writing data are stored as an electronic file. More specifically, the electronic pen functions as a position indicator which indicates, to a main body of the device, proximate positions of the electronic pen on the writing surface. The above-described electronic pen includes a core body portion, an urging spring, and a switch that detects a pressing force that is applied to the core body portion by the writing. The core body portion is urged by the urging spring toward a leading end side of the electronic pen.

The above-described switch may include a substrate and two coil springs to achieve durability and smooth operability of the electronic pen. The substrate has two plated contact points. One end portions of the coil springs are respectively attached to the contact points. When the operator presses the core body portion against the writing surface to write characters, etc., the core body portion moves and comes into contact with the other end portions of the respective coil springs. As a result, the switch is switched to an ON state. Hereinafter, the operation of pressing the core body portion against the writing surface will be referred to as a pen-down operation. On the other hand, when the operator stops writing characters, etc. and removes the core body portion from the writing surface, the core body portion is separated from the respective coil springs due to a reaction force of the urging spring. As a result, the switch is switched to an OFF state. Hereinafter, the operation of removing the core body portion from the writing surface will be referred to as a pen-up operation.

SUMMARY

With an electronic pen having the above-described structure, when the core body portion comes into contact with the coil springs when the operator performs writing, the one end portion of the coil spring may be pressed hard against the contact point in some cases. There is thus a possibility that plating applied on the contact points may come off when the core body portion repeatedly makes contact with and moves away from the coil springs every time the operator performs writing. Consequently, there is a possibility that a penstroke life of the substrate may be shortened.

Embodiments of the broad principles derived herein provide a position indicator capable of prolonging a penstroke life of a substrate that detects a pressing force of a core body portion.

A position indicator according to an aspect of the present disclosure is a position indicator that indicates a contact position to a position detection device. The position indicator includes a case, a signal output device, a core body portion, an urging device, a substrate, a plurality of flat springs, and a conduction member. The case has a cylindrical shape and has an opening in at least one end thereof. The signal output device is built into the case and outputs, to the position detection device, a detection signal that is detected by the position detection device. The core body portion has a column-like shape, is provided to be freely movable inside the case along an axial direction, and a leading end portion thereof protrudes from the opening. The urging device is provided inside the case and urges the core body portion toward the one end side of the case. The substrate includes a circuit electrically connected to the signal output device and is arranged on the other end side opposite to the one end side in the case, while being separated from the core body portion in the axial direction. The substrate extends in a direction parallel with the axial direction and includes an end surface facing the one end side. The plurality of flat springs are provided in the substrate and are electrically connected to the circuit. The plurality of flat springs have elasticity in the axial direction, protrude from the substrate toward the core body portion while making contact with the end surface, and are separated from each other. The conduction member is provided in a rear end portion of the core body portion positioned on an opposite side to the leading end portion of the core body portion. The conduction member is electrically conductive and causes the plurality of flat springs to become conductive to each other by moving from a position separated from the plurality of flat springs to a position of contact with the plurality of flat springs along with a movement of the core body portion toward the other end side.

BRIEF DESCRIPTION OF THE DRAWINGS

Embodiments will be described below in detail with reference to the accompanying drawings in which.

DETAILED DESCRIPTION

Figure 1:
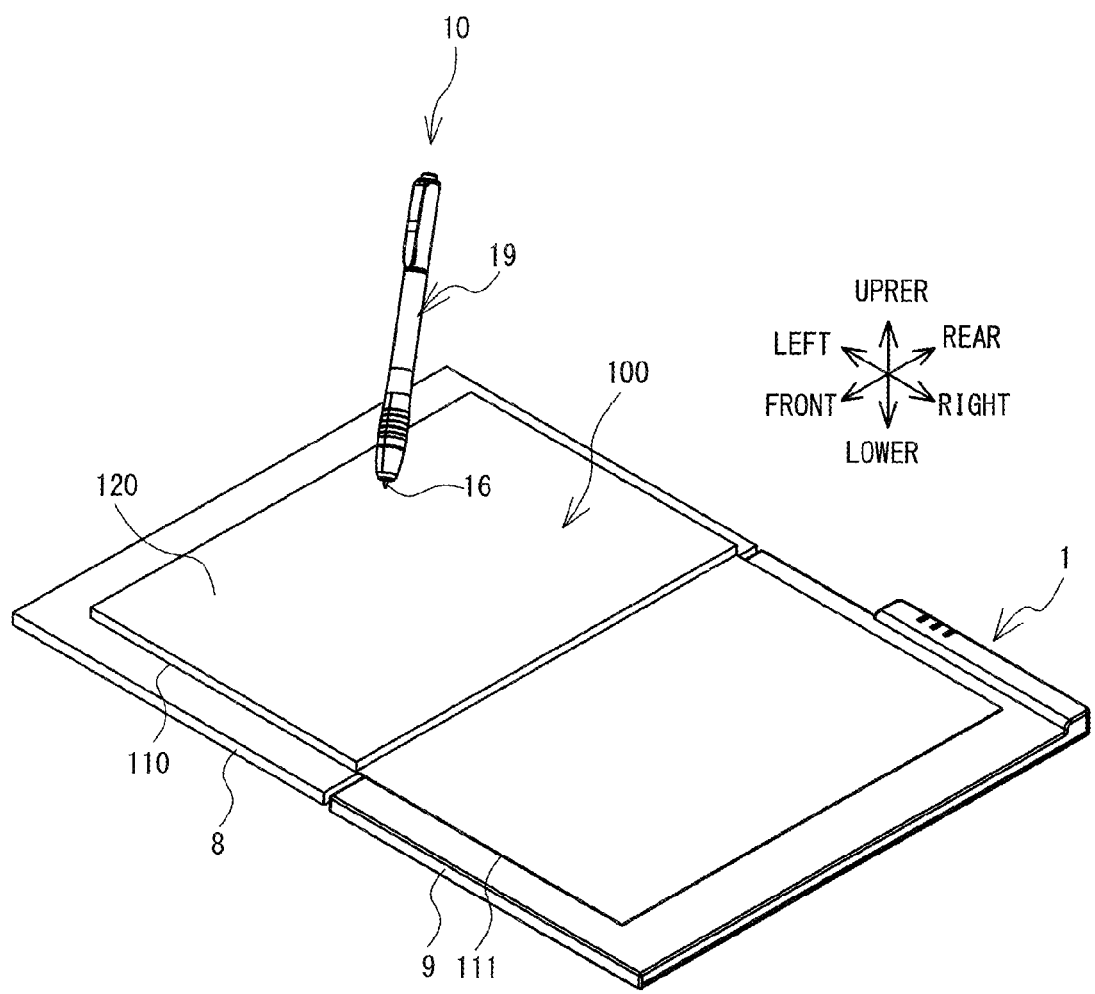
FIG. 1 is a perspective view of an information input device 1.

An electronic pen 10, which is an embodiment of the present disclosure, will be described below with reference to the accompanying drawings. The drawings are used for explaining technological features that the present disclosure can utilize. Accordingly, device configurations and the like that are shown in the drawings are merely explanatory examples and do not serve to restrict the present disclosure to those configurations. In the description to be made below, an upper-left side, a lower-right side, an upper side, a lower side, a lower-left side, and an upper-right side in FIG. 1 correspond to a left side, a right side, an upper side, a lower side, a front side, and a rear side of an information input device 1, respectively. A lower side, an upper side, a right side, and a left side in FIG. 2 correspond to the front side, the rear side, the right side, and the left side of the information input device 1, respectively. A lower side, an upper side, a lower-left side, an upper-right side, an upper-left side, and a lower-right side in FIG. 3 correspond to a leading end side, a rear end side, a front side, a rear side, a left side, and a right side of the electronic pen 10, respectively. A lower side, an upper side, a lower-left side, an upper-right side, an upper-left side, and a lower-right side in FIG. 4, FIG. 5, and FIG. 7 correspond to the leading end side, the rear end side, the rear side, the front side, the right side, and the left side of the electronic pen 10, respectively. A lower side, an upper side, a left side, a right side, an upper-left side, and a lower-right side in FIG. 6 correspond to the leading end side, the rear end side, the rear side, the front side, the right side, and the left side of the electronic pen 10, respectively. A lower side, an upper side, a left side, and a right side in FIG. 8 correspond to the leading end side, the rear end side, the rear side, and the front side of the electronic pen 10, respectively.

An overview of the information input device 1 will be described with reference to FIG. 1 and FIG. 2. The information input device 1 is a thin and light-weight handwriting input device with which a user can perform an input operation using the electronic pen 10 according to the present embodiment. When information is written on a paper medium 100, which is mounted on the information input device 1, using the electronic pen 10, the information input device 1 detects positions of the electronic pen 10 over time and then electronizes the positions. The information input device 1 includes cases 8 and 9. The cases 8 and 9 are made of resin and have a rectangular thin plate-like shape, respectively. Arrangements of the cases 8 and 9 can be changed between an open state in which the cases 8 and 9 are open in the left-right direction, as shown in FIG. 1, and a folded state (not shown in the drawings) in which the cases 8 and 9 are folded together.

The paper medium 100 is fixed to upper surfaces of the cases 8 and 9. The case 9 houses various substrates (not shown in the drawings), such as a sensor substrate 23, as shown in FIG. 2. The case 8 houses various substrates such as a sensor substrate 24. The sensor substrates 23 and 24 have a rectangular flat plate-like shape, respectively. The sensor substrates 23 and 24 detect positions of the electronic pen 10, which comes into contact with or comes close to detection areas 27 and 28 provided on upper surfaces of the sensor substrates 23 and 24, using an electromagnetic induction method. The cases 8 and 9 house the sensor substrates 23 and 24 in a state in which the detection areas 27 and 28 of the sensor substrate 23 and 24 are arranged in alignment with positioning portions 81 and 82, respectively.

Figure 2:
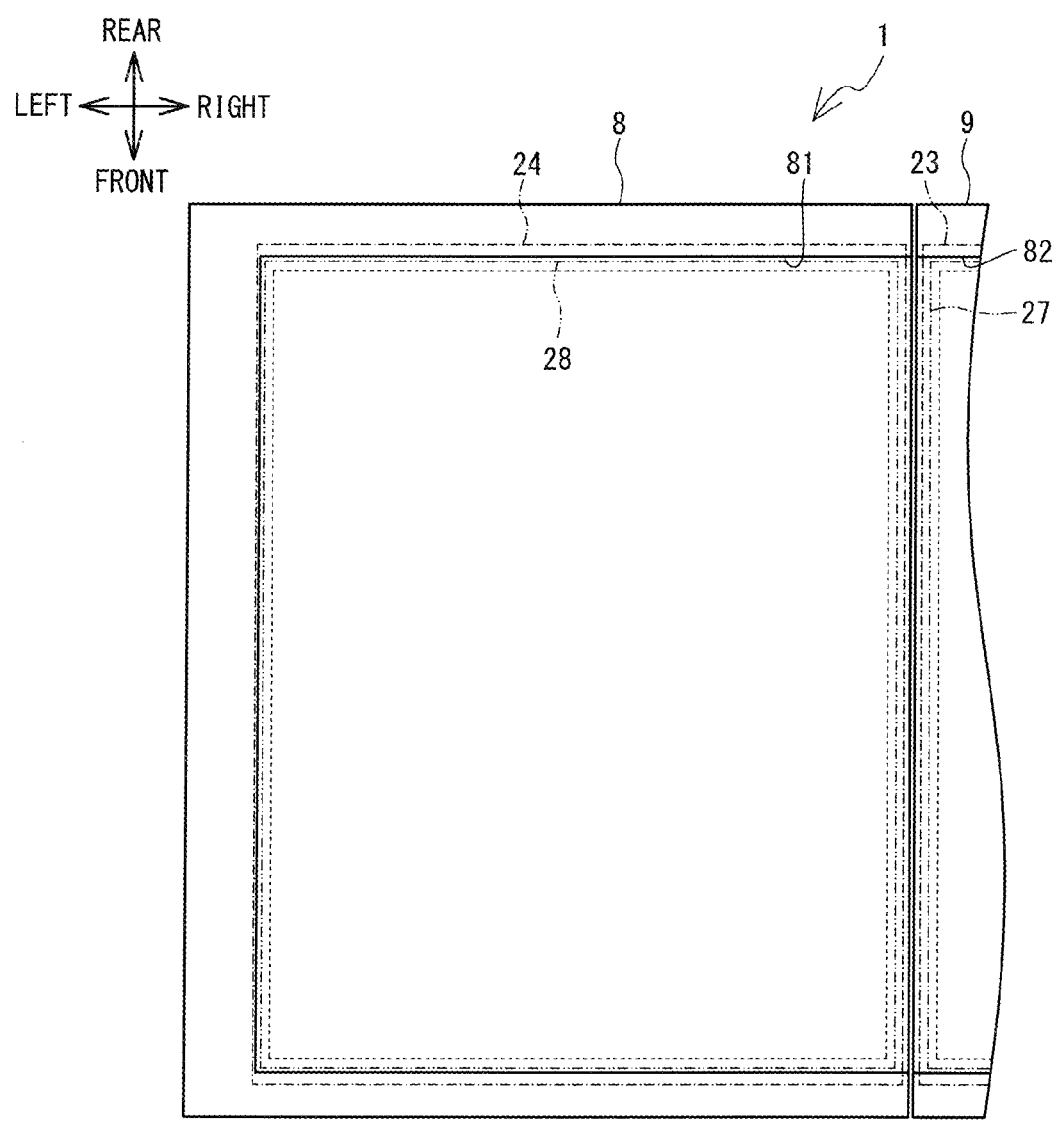
FIG. 2 is a partial plan view of the information input device 1.

The paper medium 100 is a booklet-like medium that can be opened in the left-right direction, as shown in FIG. 1. The paper medium 100 is formed by binding together a pair of cover sheets (a front cover sheet 110 and a back cover sheet 111) and a plurality of paper sheets 120 at respective edge portions. One example of the paper medium 100 is an A5-size notebook. The paper medium 100 is mounted on the information input device 1 so that the front cover sheet 110 is placed on the upper surface of the case 8 and the back cover sheet 111 is placed on the upper surface of the case 9. With the paper medium 100 mounted on the information input device 1, the user can use the electronic pen 10 to write information on the paper sheet 120. Positional information of the electronic pen 10, which writes information on the paper medium 100, is detected by the sensor substrate 23 or the sensor substrate 24. The sensor substrate 23 or the sensor substrate 24 is housed respectively in the case 8 or the case 9 that faces the paper sheet 120 on which the information has been written.

Figure 3:
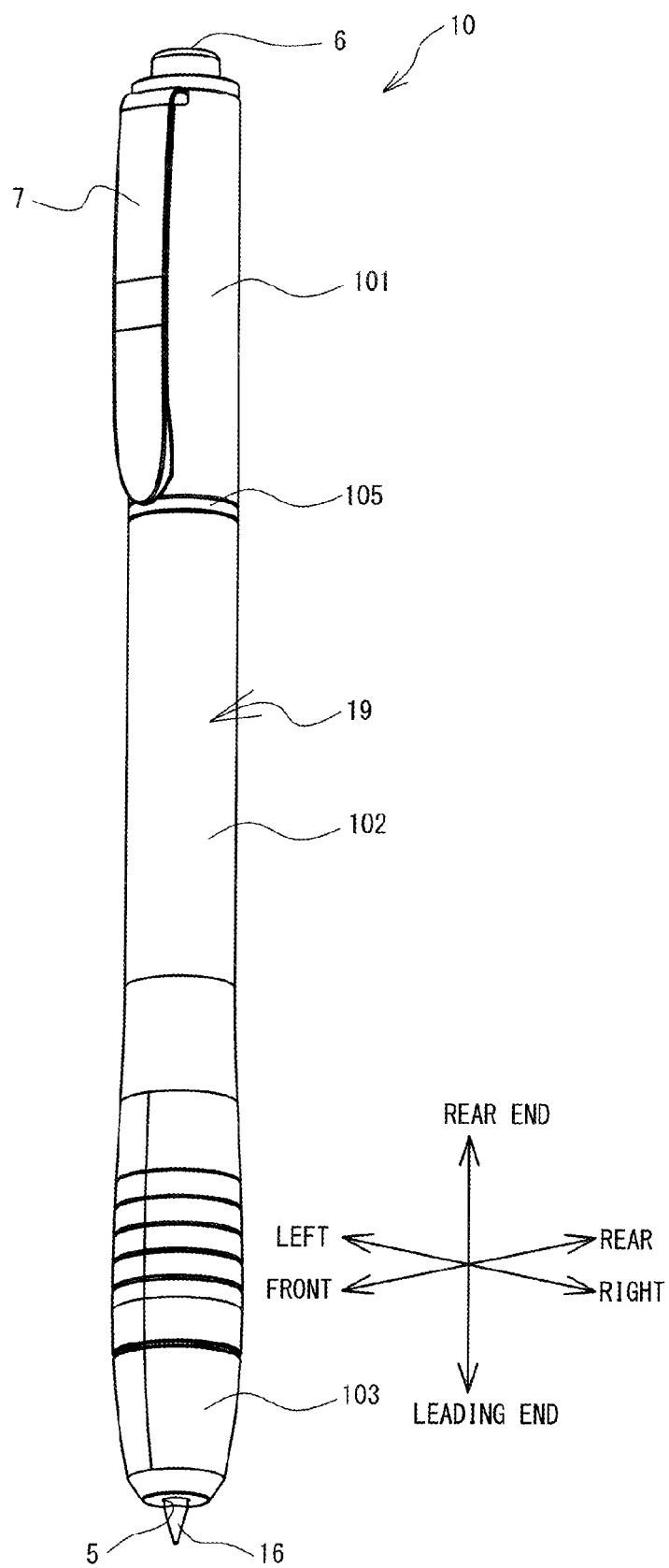
FIG. 3 is a perspective view of an electronic pen 10.

An external structure of the electronic pen 10 will be described with reference to FIG. 3. The electronic pen 10 is formed in a substantially column-like shape, which is long in an axial direction. Hereinafter, a direction along which an axis line (not shown in the drawings) of the electronic pen 10 extends will be referred to as the axial direction. The electronic pen 10 includes a cylindrical case 19 that extends in the axial direction. An opening 5 is provided in a leading end portion of the case 19 and a knock portion 6 in a rear end portion thereof. The knock portion 6 is connected with a pen point 16, which can protrude from and retract inside the opening 5, via a known ratchet mechanism that is provided inside the case 19. As a result of the knock portion 6 being pressed, the pen point 16 moves between a position at which the pen point 16 protrudes from the opening 5 and a position at which the pen point 16 is refracted inside the case 19. When the user writes information on the paper sheet 120, the user holds the electronic pen 10 while the pen point 16 is protruding from the opening 5. When the user presses the pen point 16 of the electronic pen 10 against the writing surface of the paper sheet 120, namely, when the electronic pen 10 is in a pen-down state, a circuit (not shown in the drawings), which is provided in a substrate 40 (to be described below) arranged inside the case 19, is switched to an ON state. On the other hand, when the user stops writing characters, etc. and removes the pen point 16 from the writing surface of the paper sheet 120, namely, when the electronic pen 10 is in a pen-up state, the circuit (not shown in the drawings) is switched to an OFF state. When the circuit is switched to the ON state, a writing signal is output as a detection signal from a coil 12 (to be described below) connected to the substrate 40. The writing signal is a magnetic field of a predetermined frequency. The information input device 1 detects the positional information of the electronic pen 10 by receiving the writing signal that is output from the electronic pen 10. Note that a mechanism of the manner in which the circuit provided in the substrate 40 is switched on and off by the pen-down and pen-up operations will be described below.

The case 19 is formed of three parts along the axial direction, namely, a rear-side portion 101, a central portion 102, and a cap portion 103. A flat spring 7 is provided in a front-side portion of a side surface of the rear-side portion 101. The flat spring 7 may be used to hold the electronic pen 10 by tucking the electronic pen 10 in a jacket pocket, for example. A leading end portion of the rear-side portion 101 and a rear end portion of the central portion 102 are connected together via a ring 105. The cap portion 103 is attached to a leading end portion of the central portion 102. The cap portion 103 includes the above-described opening 5 at a leading end portion thereof and protects the pen point 16 that protrudes from and retracts inside the opening 5.

Figure 4:
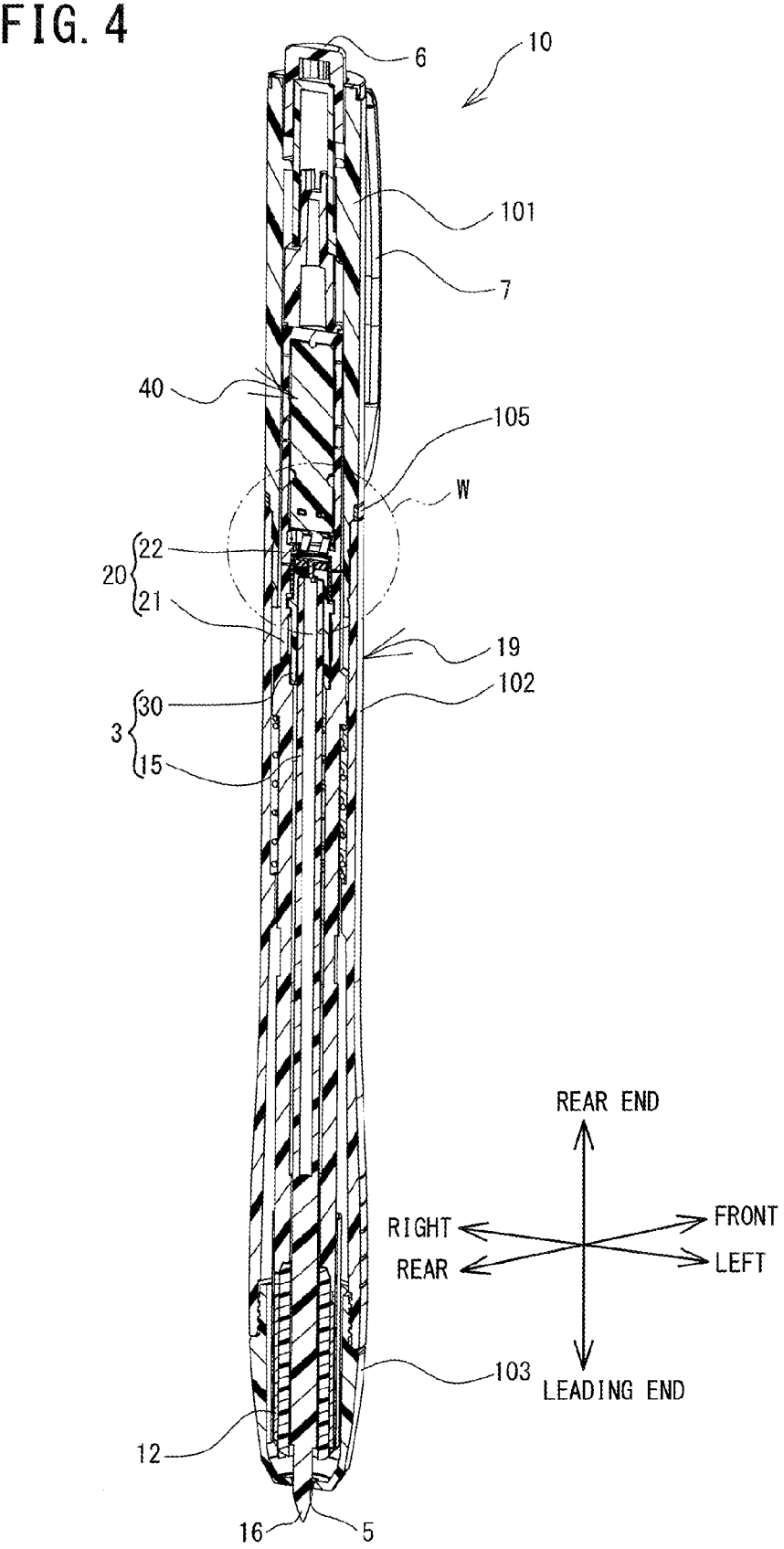
FIG. 4 is a cross-sectional view of the electronic pen 10 along an axial direction as viewed from a rear-left side.
Figure 5:
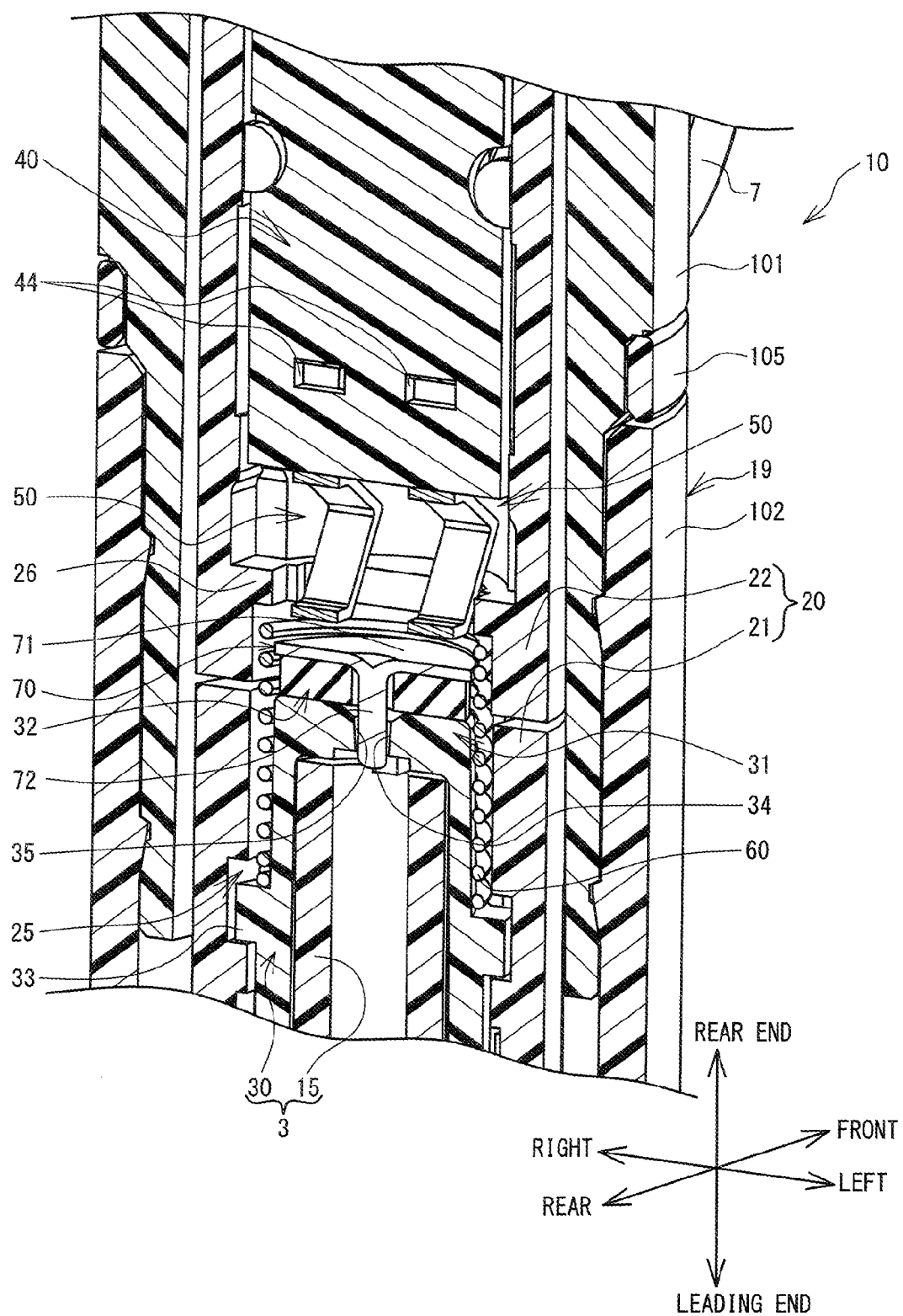
FIG. 5 is a partial cross-sectional view of the electronic pen 10, along the axial direction, showing a neighboring area around a substrate 40 and a conduction member 70, as viewed diagonally from the rear-left side, when a pen-up operation of the electronic pen 10 is performed.
Figure 6:
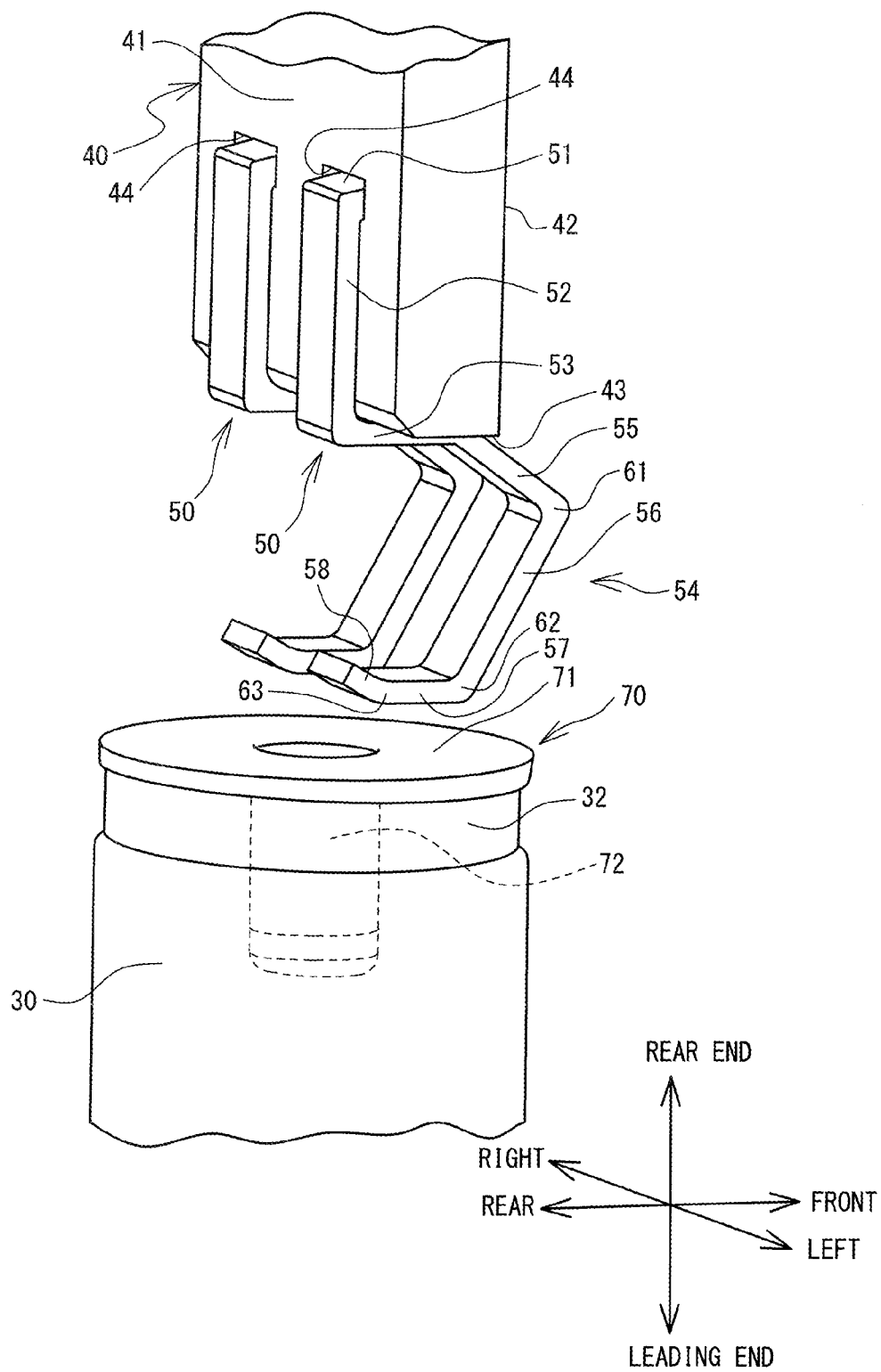
FIG. 6 is a perspective view of the substrate 40 and the neighboring area around the conduction member 70.

An internal structure of the electronic pen 10 will be described with reference to FIG. 4 to FIG. 6. The electronic pen 10 in the pen-up state is illustrated in FIG. 4 to FIG. 6. FIG. 5 is an enlarged view of an area W shown in FIG. 4. The electronic pen 10 includes, inside the case 19, a main frame 20, a core body portion 3, the coil 12, the substrate 40, and a coil spring 60 (refer to FIG. 5), etc., as shown in FIG. 4. The main frame 20 is a substantially cylindrical resin part extending in the axial direction. The main frame 20 is arranged over an area extending from a substantially central portion of the rear-side portion 101 in the axial direction to the cap portion 103. The main frame 20 is connected with the knock portion 6 and can move relatively to the case 19 when the pen point 16 protrudes from and retracts inside the opening 5. An outer peripheral portion of the main frame 20 is partially open. The main frame 20 includes a first main frame 21 and a second main frame 22. The first main frame 21 forms a part of the main frame 20 extending from a substantially central portion in the axial direction to a leading end portion of the main frame 20. The second main frame 22 forms a part of the main frame 20 extending toward the rear end side beyond a rear end of the first main frame 21.

A groove 25, which is recessed outward in a radial direction, is formed, along a peripheral direction, in an inner peripheral surface on the rear end side of the first main frame 21, as shown in FIG. 5. A flange portion 26, which extends inward in the radial direction, is provided, along the peripheral direction, in an inner peripheral surface of the second main frame 22. The flange portion 26 has a thickness in the axial direction.

The core body portion 3 has a column-like shape extending in the axial direction inside the first main frame 21. The core body portion 3 is provided so that it can move in the axial direction with respect to the main frame 20. In other words, the main frame 20 can move relative to the core body portion 3 in the axial direction. The core body portion 3 includes a refill holder 30 and a refill 15. The refill holder 30 is a bottomed cylindrical resin part extending in the axial direction. A leading end portion of the refill holder 30 is open. A flat surface portion 31 is formed in a rear end portion of the refill holder 30. A through hole 34 extending in the axial direction is formed in a central portion of the flat surface portion 31. A flange portion 33, which extends outward in the radial direction, is provided along the peripheral direction in an outer peripheral surface on the rear end side of the refill holder 30. The flange portion 33 has a thickness in the axial direction and is arranged inside the groove 25.

The refill 15 is a refill core having a substantially tube-like shape and extending in the axial direction, as shown in FIG. 4. Ink is filled inside the refill 15. The pen point 16 is formed in a leading end portion of the refill 15. A rear end portion of the refill 15 is press-fitted and held inside the refill holder 30. The coil 12 is provided so as to be wound around the leading end portion of the refill 15. The coil 12 can generate the magnetic field of the predetermined frequency.

A circular elastic member 32, which is elastic in the axial direction, is provided on a rear end surface of the flat surface portion 31 of the refill holder 30, as shown in FIG. 5. The elastic member 32 has a plate-like shape having a thickness in the axial direction. An opening 35 formed inside the elastic member 32 communicates with the through hole 34. Although the elastic member 32 is formed of insulation rubber in the present embodiment, the elastic member 32 may be formed of conductive rubber.

A conduction member 70, which is electrically conductive, is provided on a rear end surface of the elastic member 32, as shown in FIG. 6. The conduction member 70 is a metal part having a plate-like shape and a thickness in the axial direction. The conduction member 70 includes a flat portion 71 and a protruding portion 72. The flat portion 71 is formed in a circular shape and is abutted against the rear end surface of the elastic member 32. The protruding portion 72 has a column-like shape and protrudes from a central section of the flat portion 71 toward the leading end side. The protruding portion 72 blocks, from the leading end side, an opening formed in the central section of the flat portion 71. The protruding portion 72 is press-fitted into the opening 35 (refer to FIG. 5) and the through hole 34 (refer to FIG. 5). More specifically, the conduction member 70 is provided on a rear end portion of the core body portion 3. Note that the conduction member 70 is manufactured by stamping in the present embodiment. Thus, the cost of the electronic pen 10 can be reduced compared with a case when the conduction member 70 is manufactured by machining. Further, the conduction member 70 can simplify an assembly of the electronic pen 10 as the conduction member 70 is provided by being press-fitted to the rear end portion of the core body portion 3.

The coil spring 60 is provided inside the main frame 20 so as to be wound around the refill holder 30, the elastic member 32, and the conduction member 70, as shown in FIG. 5. The coil spring 60 is arranged in a compressed state. A rear end portion of the coil spring 60 is abutted against the flange portion 26, and a leading end portion of the coil spring 60 is abutted against the flange portion 33. As a result of this, the coil spring 60 urges the core body portion 3 toward the leading end side and urges the main frame 20 toward the rear end side. By being urged by the coil spring 60, the main frame 20 is held at a position (hereinafter referred to as a first position) at which the flange portion 33 is abutted against a wall surface that forms a leading end portion of the groove 25.

The substrate 40 is attached to the main frame 20 at a position at which the substrate 40 is separated from the core body portion 3 toward the rear end side along the axial direction. The substrate 40 has a thickness in a front-to-rear direction and is formed in a plate-like shape extending in the axial direction. The substrate 40 is provided with at least a circuit (not shown in the drawings) that externally outputs the writing signal. Both ends of the coil 12 are electrically connected to the circuit of the substrate 40 via wiring (not shown in the drawings).

The substrate 40 includes a first end surface 41, a second end surface 42, a third end surface 43, and two through holes 44, as shown in FIG. 6. The first end surface 41, the second end surface 42, and the third end surface 43 form a rear surface, a front surface, and a leading end surface of the substrate 40, respectively. The first end surface 41 and the second end surface 42 face each other, and the third end surface 43 faces the leading end side of the electronic pen 10 (refer to FIG. 1). The two through holes 44 are provided side by side in the left-right direction and penetrate in the thickness direction through a section located on the leading end side of the substrate 40.

Two flat springs 50 are formed of conductive metal members and are provided in the substrate 40, respectively. The two flat springs 50 are separated from each other in the left-right direction, which is orthogonal to the axial direction. Each of the two flat springs 50 includes an insertion portion 51, an extension portion 52, an abutment portion 53, and a protrusion portion 54. The insertion portion 51 passes through the through hole 44 and extends in the front-to-rear direction. A front end portion of the insertion portion 51 protrudes frontward from the substrate 40 and is fixed to the second end surface 42 by soldering (refer to FIG. 8). By this, each of the two flat springs 50 is electrically connected to the circuit (not shown in the drawings). It is preferable that phosphor bronze be used as solder 59 (refer to FIG. 8), which is used for soldering, to ensure good soldering performance.

The extension portion 52 extends from a rear end portion of the insertion portion 51 to the leading end side of the substrate 40 in parallel with the first end surface 41. A front surface of the extension portion 52 is in contact (surface contact) with the first end surface 41. The abutment portion 53 extends from a leading end portion of the extension portion 52 to the leading end side of the second end surface 42 in parallel with the third end surface 43. A rear end surface of the abutment portion 53 is in contact (surface contact) with the third end surface 43.

The protrusion portion 54 linearly protrudes from a front end portion of the abutment portion 53 toward the leading end side. More specifically, the protrusion portion 54 protrudes from the substrate 40 toward the core body portion 3. The protrusion portion 54 is elastic in the axial direction and has a first extension portion 55, a second extension portion 56, a contact portion 57, and a third extension portion 58. The first extension portion 55 extends from the front end portion of the abutment portion 53 diagonally frontward toward the leading end side. The second extension portion 56 extends from a leading end portion of the first extension portion 55 diagonally rearward toward the leading end side. The first extension portion 55 and the second extension portion 56 are connected to each other via a bent portion 61.

The contact portion 57 extends rearward from a leading end portion of the second extension portion 56 along the front-to-rear direction. The contact portion 57 and the second extension portion 56 are connected to each other via a bent portion 62. When the main frame 20 is at the first position, the contact portion 57 is separated from the flat portion 71 of the conduction member 70 toward the rear end side along the axial direction. A clearance between the contact portion 57 and the flat portion 71 in the axial direction is 0.5 mm, for example. As the coil spring 60 (refer to FIG. 5) urges the flange portions 26 and 33 (refer to FIG. 5) in a direction separating the flange portions 26 and 33 from each other, the contact portion 57 is held in a state of being separated from the flat portion 71. The third extension portion 58 extends from a rear end portion of the contact portion 57 diagonally rearward toward the rear end side. The third extension portion 58 and the contact portion 57 are connected to each other via a bent portion 63.

Figure 7:
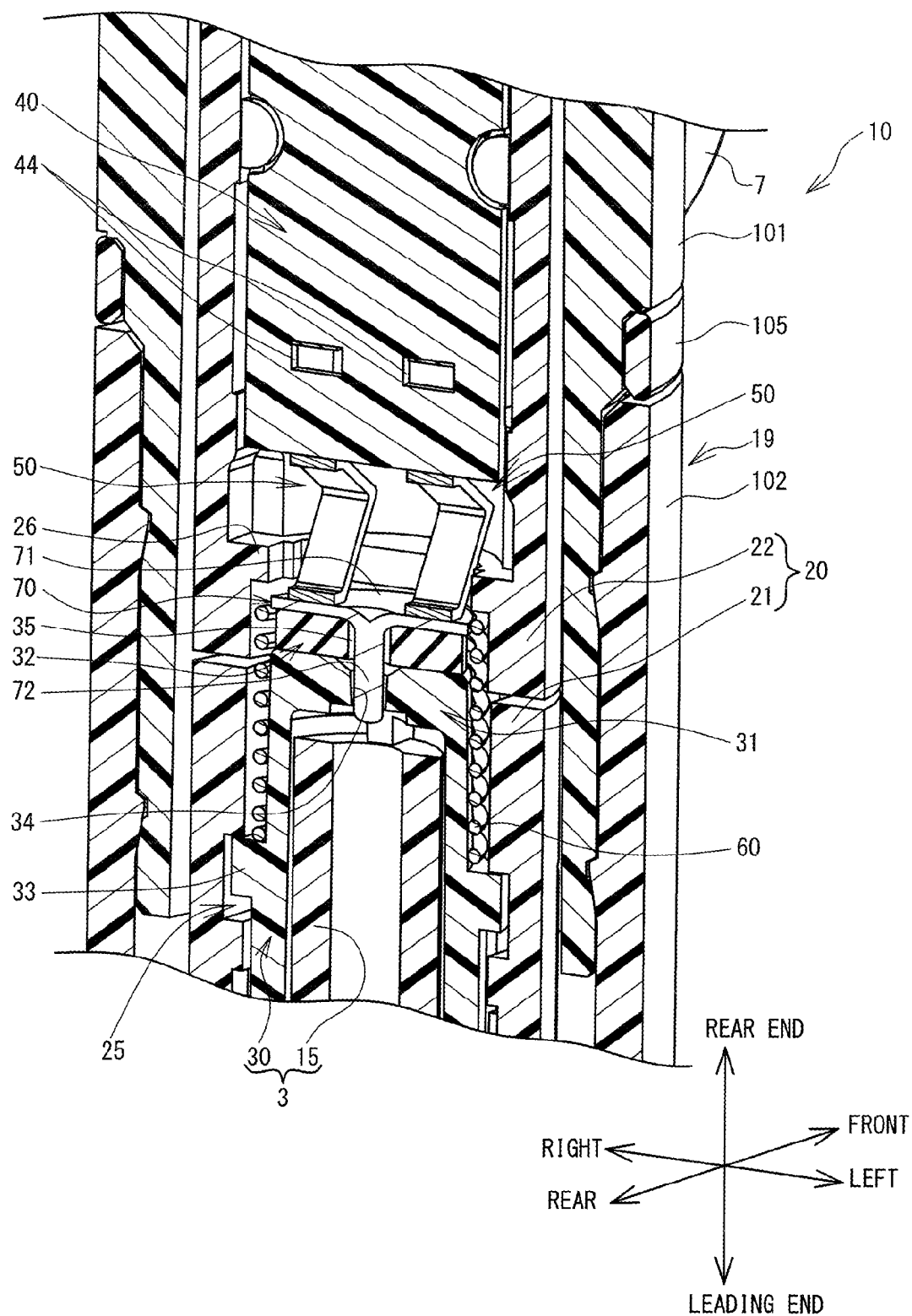
FIG. 7 is a partial cross-sectional view, along the axial direction, showing the substrate 40 and the neighboring area around the conduction member 70, as viewed diagonally from the rear-left side, when a pen-down operation of the electronic pen 10 is performed.
Figure 8:
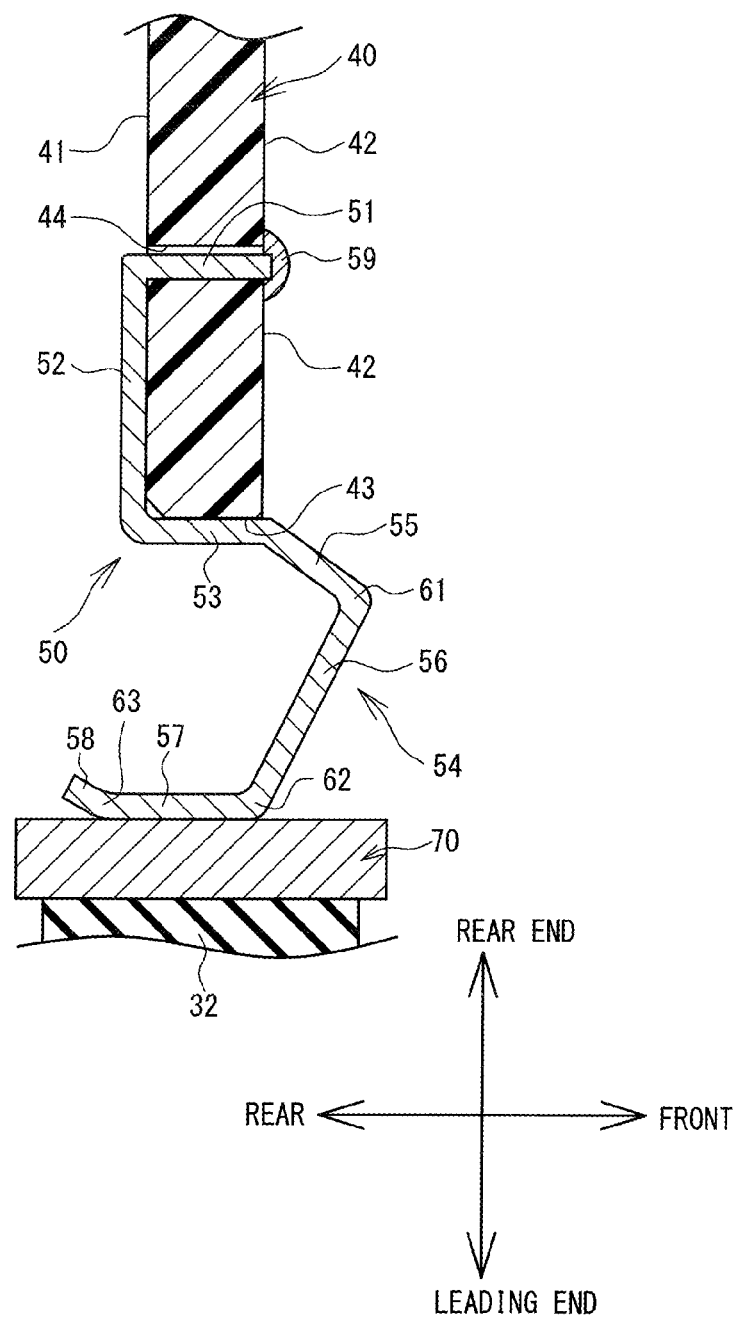
FIG. 8 is a partial cross-sectional view of the substrate 40, a flat spring 50, the conduction member 70, and an elastic member 32 as viewed from a left side, when the pen-down operation of the electronic pen 10 is performed.

A case in which the pen-down operation of the electronic pen 10 is performed will be described with reference to FIG. 1, FIG. 7, and FIG. 8. When the user holding the case 19 performs the pen-down operation of the electronic pen 10 on the writing surface of the paper sheet 120, the main frame 20, which is at the first position, moves toward the leading end side with respect to the pen point 16 pressed against the writing surface. More specifically, a writing load applied to the pen point 16 presses down the main frame 20 positioned at the first position. The main frame 20 resists the urging force of the coil spring 60 and moves toward the leading end side along the axial direction. At this time, the wall surface forming the leading end portion of the groove 25 is separated from the flange portion 33. Along with the movement of the main frame 20 toward the leading end side, the substrate 40 moves toward the core body portion 3 and the contact portion 57 of each of the two flat springs 50 comes into contact with the flat portion 71 of the conduction member 70. In other words, when the pen-down operation of the electronic pen 10 is performed, the core body portion 3 moves, relative to the main frame 20, toward the rear end side along the axial direction. As a result, the conduction member 70, which moves together with the core body portion 3, comes into contact with the respective contact portions 57 of the two flat springs 50.

Here, due to a load (hereinafter referred to as a contact load) generated when the conduction member 70 and the contact portions 57 come into contact with each other, the elastic member 32 and the respective protrusion portions 54 of the two flat springs 50 elastically deform so as to contract in the axial direction. The contact load is transmitted from the elastically deformed protrusion portions 54 to the third end surface 43 via the abutment portion 53 and is then distributed to the third end surface 43. Thus, the contact load is not concentrated on a particular area of the substrate 40. Further, as the contact portions 57 extend in the front-to-rear direction that is orthogonal to the axis direction, in which the conduction member 70 moves in a relative manner, the contact load is easily transmitted through the protrusion portions 54. The contact load is thus easily distributed to the third end surface 43.

Further, when the conduction member 70 and the contact portions 57 come into contact with each other, the contact load transmitted to the third end surface 43 can be alleviated as the protrusion portions 54 and the elastic member 32 elastically deform. At the same time, as the user feels less reaction force when the user performs the pen-down operation of the electronic pen 10, the electronic pen 10 can achieve smooth operability for the user. Note that stress transmitted to the solder 59 is also reduced as a result of the contact load being distributed to the third end surface 43. Durability of the substrate 40 is thus improved as the solder 59 is less likely to be destroyed. Further, when the conduction member 70 and the contact portions 57 come into contact with each other, a state is obtained in which the third end surface 43 supports the two flat springs 50 from the rear end side. This inhibits the two flat springs 50 from being displaced in the axial direction.

The two flat springs 50 that come into contact with the conduction member 70 become conductive to each other, and the circuit provided in the substrate 40 is switched from the OFF state to the ON state. The substrate 40 detects that the pen point 16 is pressed, and the coil 12 outputs a predetermined writing signal. The main frame 20 moves further toward the leading end side and stops at a position (hereinafter referred to as a second position) at which a wall surface forming the rear end of the groove 25 abuts against a rear end portion of the flange portion 33. The main frame 20 positioned at the second position is restricted to move further toward the leading end side. Thus, when the pen-down operation of the electronic pen 10 is performed, even if an excessive load is applied to the pen point 16, the load transmitted to the two flat springs 50 is reduced.

Then, when the user performs the pen-up operation of the electronic pen 10, the main frame 20 moves from the second position to the first position due to the urging force of the coil spring 60, and the two flat springs 50 are separated from the conduction member 70. The circuit provided in the substrate 40 is switched from the ON state to the OFF state. A relative movement amount of the core body portion 3 in the axial direction is approximately 0.5 mm when the pen-down operation and the pen-up operation of the electronic pen 10 is performed. Thus, the electronic pen 10 can achieve smooth operability for the user.

Next, a method to attach the two flat springs 50 to the substrate 40 will be described with reference to FIG. 8. The insertion portion 51 is inserted from a rear side of the through hole 44 so as to cause a front end portion of the insertion portion 51 to protrude frontward beyond the second end surface 42. Then, the extension portion 52 is abutted against the first end surface 41, and the abutment portion 53 is abutted against the third end surface 43. In this state, the front end portion of the insertion portion 51 is soldered and fixed to the second end surface 42. As a result, the two flat springs 50, which are electrically connected to the circuit and function as contact points with and from which the conduction member 70 can make contact and move away, are provided in the substrate 40.

The two flat springs 50 attached as described above can be easily positioned in the axial direction simply by abutting the abutment portion 53 against the third end surface 43. Thus, even though the clearance between the contact portion 57 and the flat portion 71 in the axial direction is as small as 0.5 mm when the electronic pen 10 is in the OFF state, the electronic pen 10 can be easily assembled. Further, as the accuracy of the attachment of the two flat springs 50 to the substrate 40 is improved, the clearance between the contact portion 57 and the flat portion 71 is less likely to vary for each of the electronic pens 10. Thus, the electronic pen 10 can achieve the smooth operability for the user in a stable manner.

The substrate 40, which has the two flat springs 50 as the contact points thereof, can reduce costs, compared with a case in which a contact point other than the two flat springs 50 is formed on the third end surface 43 through plating processing. Further, the substrate 40 according to the present embodiment can avoid a case in which such a contact point that is formed on the third end surface 43 through plating processing wears away as a result of the conduction member 70 repeatedly making contact with and moving away from the contact point. Hereinafter, the contact point formed by plating processing will be referred to as "a plated contact point." Thus, a problem does not occur in which the circuit in the substrate 40 is not switched to the ON state even when the pen-down operation of the electronic pen 10 is performed. Further, the substrate 40 according to the present embodiment can also eliminate a problem associated with the pen-up and pen-down operations of the electronic pen 10, which is caused by wear debris generated from the plated contact point.

As described above, when the pen-down operation of the electronic pen 10 is performed, the pressed core body portion 3 resists the urging force of the coil spring 60, moves relative to the main frame 20, and comes into contact with the two flat springs 50. At this time, the contact load is distributed to the third end surface 43. Thus, the contact load is inhibited from being concentrated on a predetermined area of the substrate 40, and it is possible to prolong a penstroke life of the substrate 40.

Further, as a result of the abutment portion 53 making surface contact with the third end surface 43, the contact load becomes even more easily distributed to the third end surface 43. As a result, it is possible to further prolong the penstroke life of the substrate 40.

Further, as a result of the contact portion 57 extending in the front-to-rear direction, which is orthogonal to the axis direction, the contact load is easily transmitted through the protrusion portion 54. This makes it easier for the contact load to be distributed to the third end surface 43. As a result, it is possible to further prolong the penstroke life of the substrate 40.

Further, as a result of the elastic member 32 elastically deforming, the contact load transmitted to the third end surface 43 is alleviated. Thus, the contact load transmitted to the substrate 40 is further reduced, and as a result, it is possible to further prolong the penstroke life of the substrate 40.

Note that the present disclosure is not limited to the above-described embodiment, and the embodiment can be modified as chosen within the scope of the invention. An electronic pen 11 according to a modified example of the electronic pen 10 will be described below with reference to FIG. 9 to FIG. 12. A lower side, an upper side, a lower-left side, an upper-right side, an upper-left side, and a lower-right side in FIG. 9 correspond to a leading end side, a rear end side, a rear side, a front side, a right side, and a left side of the electronic pen 11, respectively. A lower side, an upper side, a left side, and a right side in FIG. 10 to FIG. 12 correspond to the leading end side, the rear end side, the right side, and the left side of the electronic pen 11, respectively. In the description made below, the same reference numerals will be used for the same members and portions as those of the above-described embodiment. Further, for convenience of explanation, of the two flat springs 50 of the above-described embodiment, the flat spring positioned on the right side will be referred to as a first flat spring 151 and the flat spring positioned on the left side will be referred to as a second flat spring 152. The first flat spring 151 and the second flat spring 152 have the same shape as that of the two flat springs 50.

Figure 9:
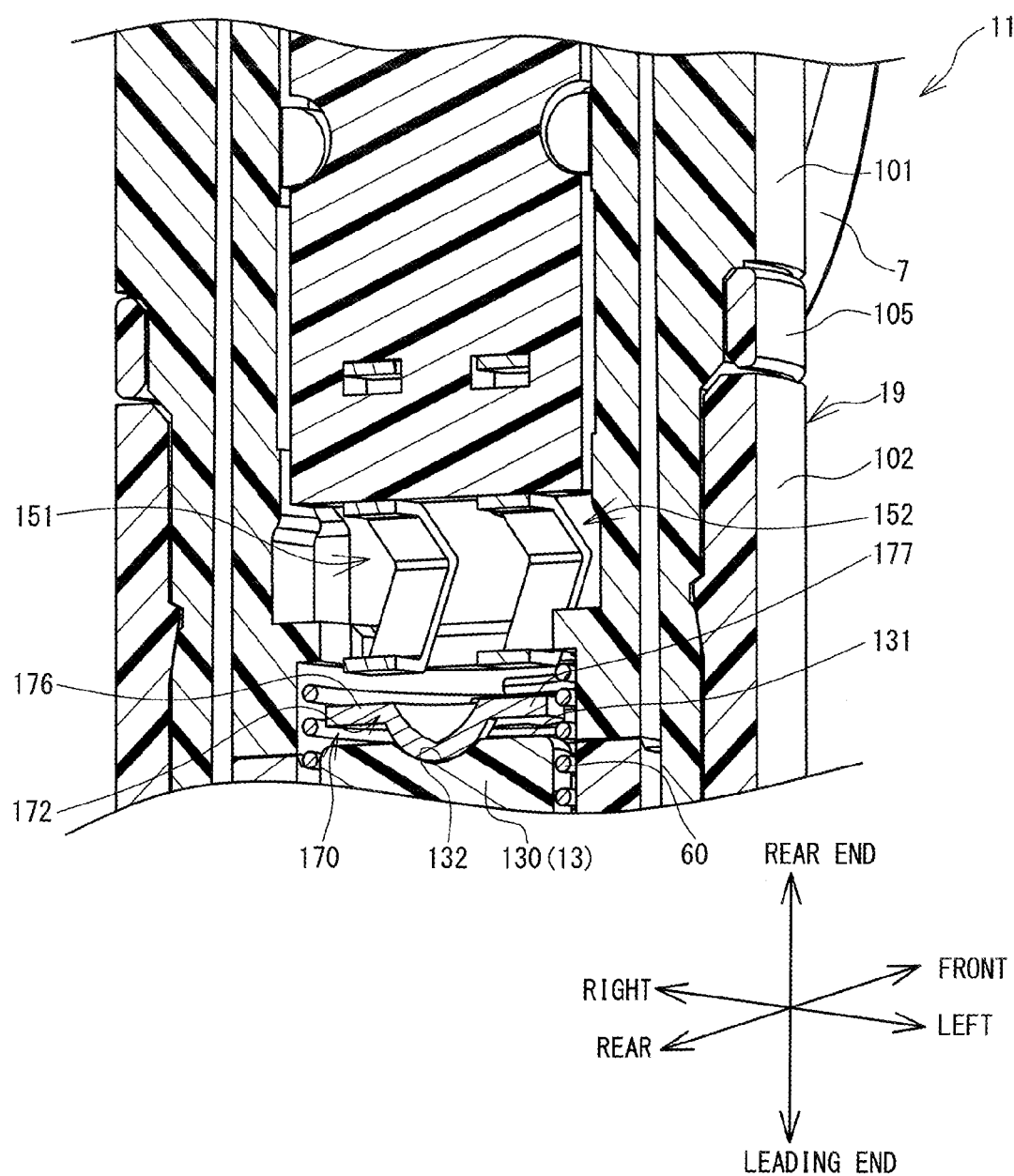
FIG. 9 is a partial cross-sectional view of an electronic pen 11, along the axial direction, showing a neighboring area around the substrate 40 and a conduction member 170 as viewed from the rear-left side, when a pen-up operation of the electronic pen 11 according to an modified example is performed.

The electronic pen 11 includes a core body portion 13 instead of the core body portion 3 of the above-described embodiment and a conduction member 170 instead of the conduction member 70, as shown in FIG. 9. The core body portion 13 includes a refill holder 130 and the refill 15 (refer to FIG. 4). The refill holder 130 extends in the axial direction, has a bottomed cylindrical shape, and has an opening on the leading end side. The rear end portion of the refill 15 is press-fitted and held inside the refill holder 130. A support portion 131 is formed in a rear end portion of the refill holder 130. A concave portion 132, which is recessed in an arc-shape toward the leading end side, is provided in a central portion of the support portion 131.

Figure 10:
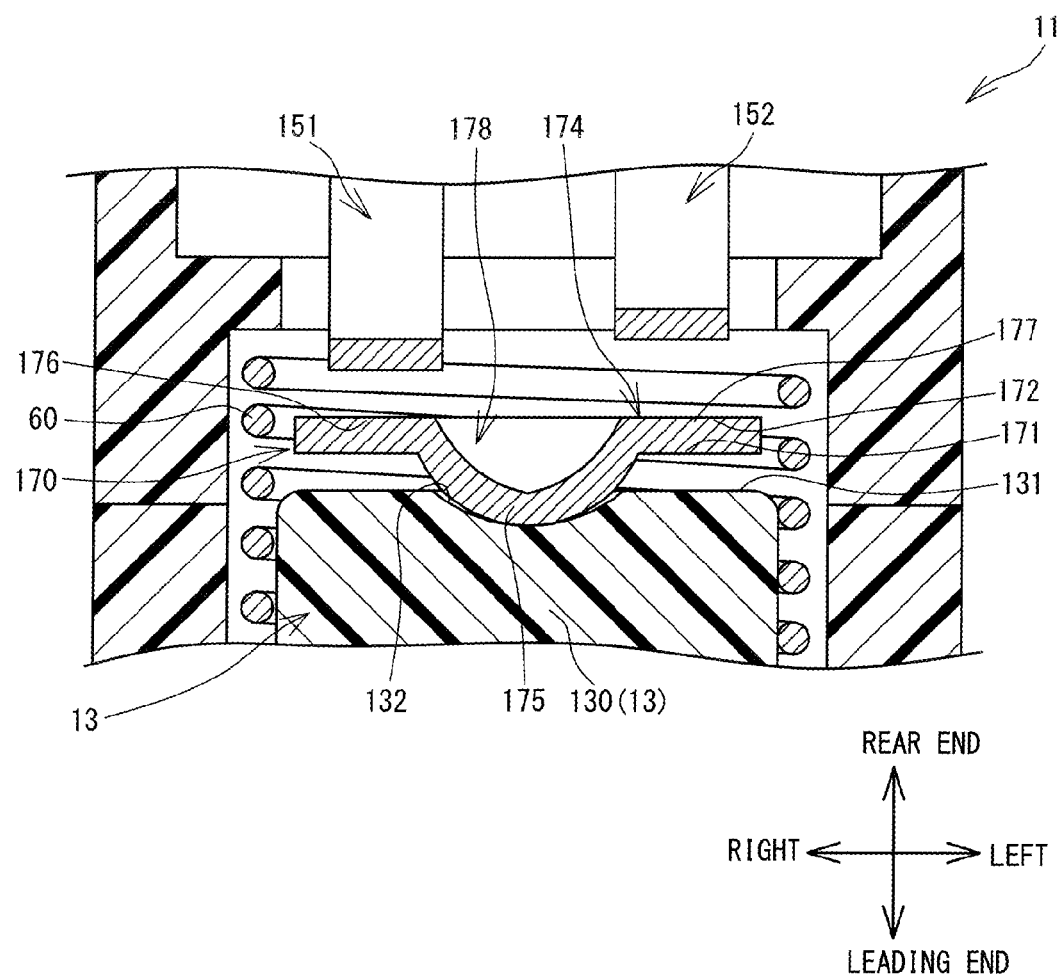
FIG. 10 is a partial cross-sectional view, along the axial direction, showing a first flat spring 151, a second flat spring 152, and the neighboring area around the conduction member 170 as viewed from a rear side, when the pen-up operation of the electronic pen 11 is performed.

The conduction member 170 has a plate-like shape having a thickness in the axial direction and includes a flat portion 174 and a convex portion 175, as shown in FIG. 10. The flat portion 174 has a circular shape and includes an opening 178, a first flat surface portion 171, and a second flat surface portion 172. The opening 178 is formed in a central portion of the flat portion 174. When viewed along the axial direction, the opening 178 is arranged between the first flat spring 151 and the second flat spring 152. The first flat surface portion 171 forms a leading end portion of the flat portion 174 and faces the leading end side of the electronic pen 11. The second flat surface portion 172 forms a rear end portion of the flat portion 174 and faces the rear end side of the electronic pen 11. The first flat surface portion 171 and the second flat surface portion 172 extend in parallel with an arrangement direction of the first flat spring 151 and the second flat spring 152 (the left-right direction). In the second flat surface portion 172, a right-side portion 176 is formed on a right side of the opening 178, and a left-side portion 177 is formed on a left side of the opening 178. The right-side portion 176 can make contact with and move away from the first flat spring 151, and the left-side portion 177 can make contact with and move away from the second flat spring 152.

The convex portion 175 protrudes in an arc-shape from a central portion of the second flat surface portion 172 toward the leading end side and blocks the opening 178 from the leading end side. The convex portion 175 fits into the concave portion 132 so as to be supported by the support portion 131. The convex portion 175 can slide with respect to the concave portion 132 so that the second flat surface portion 172 (and the first flat surface portion 171) is tilted with respect to the arrangement direction of the first flat spring 151 and the second flat spring 152 (hereinafter referred to as a flat spring arrangement direction). More specifically, the conduction member 170 can swing from a basic position thereof, while using the convex portion 175 as a point of support, so that the second flat surface portion 172 is tilted with respect to the flat spring arrangement direction. The basic position is a position in which the second flat surface portion 172 is parallel with the flat spring arrangement direction. Note that grease is applied to a space between the convex portion 175 and the concave portion 132 to ensure good sliding properties, even though the grease is not shown in the drawings.

A case in which the pen-down operation of the electronic pen 11 is performed will be described with reference to FIG. 9 to FIG. 12. Note that, in the description made below, content will be omitted if the content is the same as described in the above-described case of the pen-down operation of the electronic pen 10. First, with reference to FIG. 9, the pen-down operation of the electronic pen 11 will be described in a case in which respective lengths of the first flat spring 151 and the second flat spring 152 are substantially the same in the axial direction. When the pen point 16 (refer to FIG. 1) is pressed against the writing surface, the core body portion 13 moves toward the rear end side relative to the first flat spring 151 and the second flat spring 152. As a result, while the conduction member 170 is maintained at the basic position thereof, the right-side portion 176 comes into contact with the first flat spring 151 and the left-side portion 177 comes into contact with the second flat spring 152. The first flat spring 151 and the second flat spring 152 thereby become conductive to each other.

Next, with reference to FIG. 10 to FIG. 12, the pen-down operation of the electronic pen 11 will be described in a case in which the length of the first flat spring 151 is longer than that of the second flat spring 152 in the axial direction. It is preferable that respective shapes of the first flat spring 151 and the second flat spring 152 be identical to each other. However, due to the variation in parts, etc., the first flat spring 151 and the second flat spring 152 may have different lengths in the axial direction in some cases. Note that, in FIG. 10 to FIG. 12, to make it easier to view the drawings, a dimensional difference between the first flat spring 151 and the second flat spring 152 in the axial direction is illustrated to be larger than an actual dimensional difference.

Figure 11:
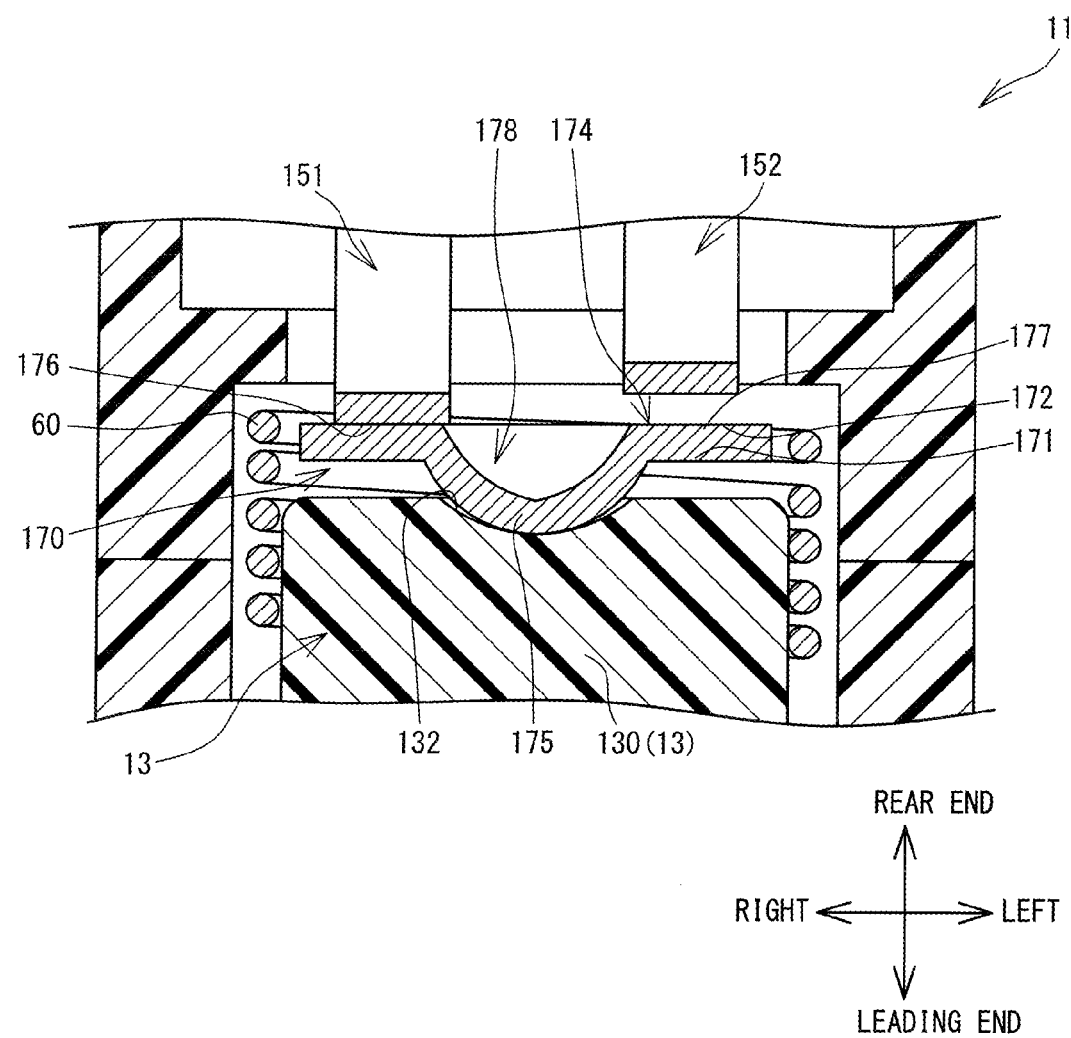
FIG. 11 is a partial cross-sectional view, along the axial direction, showing the first flat spring 151, the second flat spring 152, and the neighboring area around the conduction member 170 as viewed from the rear side, when a right-side portion 176 comes into contact with the first flat spring 151.
Figure 12:
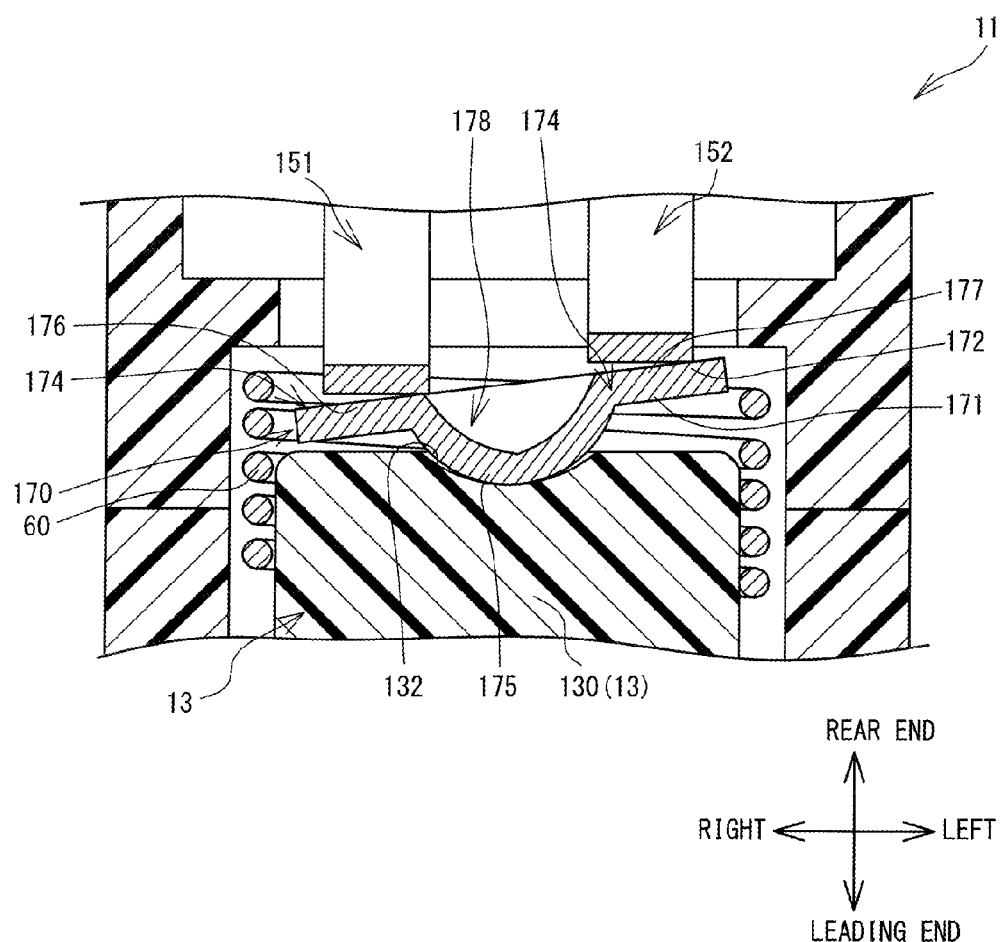
FIG. 12 is a partial cross-sectional view, along the axial direction, showing the first flat spring 151, the second flat spring 152, and the neighboring area around the conduction member 170 as viewed from the rear side, when the pen-down operation of the electronic pen 11 is performed.

As shown in FIG. 10 and FIG. 11, when the pen-down operation of the electronic pen 11 is performed, the core body portion 13 moves toward the rear end side relative to the first flat spring 151 and the second flat spring 152, while the conduction member 170 is maintained at the basic position thereof. The right-side portion 176 then comes into contact with the first flat spring 151. At this time, the left-side portion 177 is separated from the second flat spring 152.

Further, when the core body portion 13 moves in the relative manner toward the rear end side, the right-side portion 176, which is in contact with the first flat spring 151, is pressed down toward the leading end side relative to the first flat spring 151. The conduction member 170, which has been maintained at the basic position thereof, swings, while using the convex portion 175 as the point of support, in a direction causing the right-side portion 176 to move toward the leading end side and the left-side portion 177 to move toward the rear end side. As a result, the left-side portion 177 comes into contact with the second flat spring 152. The first flat spring 151 and the second flat spring 152 thereby become conductive to each other. Note that, as the above-described description also applies to the pen-down operation of the electronic pen 11 in the same manner even in a case in which the length of the second flat spring 152 is longer than that of the first flat spring 151 in the axial direction, a description for such a case is omitted herein.

As described above, even when the first flat spring 151 and the second flat spring 152 have different lengths in the axial direction due to a variation in parts, etc., the second flat surface portion 172 can reliably come into contact with the first flat spring 151 and the second flat spring 152, as a result of the conduction member 170, which is at the basic position thereof, swinging while using the convex portion 175 as the point of support. Thus, the electronic pen 11 can reliably switch the circuit in the substrate 40 to the ON state.

Note that various modifications can be made to the present disclosure besides the above-described embodiments. For example, the refill holder 30 is provided to enable the refill 15 to be replaced in the electronic pen of the above-described embodiment. However, the above-described structure can be also applied to a stylus pen, for example. In this case, it is only required that an electronic pen, which functions as a stylus pen, be provided with a core body having a shape integrating the refill 15 and the refill holder 30.

Further, although the two flat springs 50 are provided in the substrate 40 in the above-described embodiment, the number of the flat springs is not limited to two. For example, three or more of the flat springs 50 may be provided in the substrate 40. In this case, when the conduction member 70 comes into contact with all of the flat springs 50 provided in the substrate 40, the circuit provided in the substrate is switched to the ON state.

Further, although the protrusion portion 54 provided in the flat spring 50 linearly protrudes from the front end portion of the abutment portion 53 toward the leading end side in the above-described embodiment, a shape of the protrusion portion 54 is not limited to the linear shape. For example, the protrusion portion may protrude from the front end portion of the abutment portion 53 toward the leading end side, while being bent in an arc-shape. Even when the protrusion portion protrudes while being bent in an arc-shape, the flat spring, which comes into contact with the conduction member 70, can cause the protrusion portion to deform elastically.

What is claimed is:

1. A position indicator that indicates a contact position to a position detection device, the position indicator comprising:
    a case that has a cylindrical shape and has an opening in at least one end thereof;
    a signal output device that is built into the case and outputs, to the position detection device, a detection signal that is detected by the position detection device;
    a core body portion having a column-like shape, which is provided to be freely movable inside the case along an axial direction, and of which a leading end portion protrudes from the opening;
    an urging device that is provided inside the case and urges the core body portion toward one end side of the case;
    a substrate, which includes a circuit electrically connected to the signal output device, which is arranged on the other end side opposite to the one end side in the case while being separated from the core body portion in the axial direction, which extends in a direction parallel with the axial direction, and which includes an end surface facing the one end side;
    a plurality of flat springs, which are provided in the substrate and are electrically connected to the circuit, which have elasticity in the axial direction, which protrude from the substrate toward the core body portion while making contact with the end surface, and which are separated from each other; and
    a conduction member, which is provided in a rear end portion of the core body portion positioned on an opposite side to the leading end portion of the core body portion, which is electrically conductive, and which causes the plurality of flat springs to become conductive to each other by moving from a position separated from the plurality of flat springs to a position of contact with the plurality of flat springs along with a movement of the core body portion toward the other end side.

2. The position indicator according to claim 1, wherein each of the plurality of flat springs includes an abutment portion that extends in parallel with the end surface and is in contact with the end surface.

3. The position indicator according to claim 2, further comprising
    an elastic member that is provided in the rear end portion of the core body portion and supports the conduction member from an opposite side to the plurality of flat springs.

4. The position indicator according to claim 2, wherein the plurality of flat springs include a first flat spring and a second flat spring,
    the core body portion includes, in the rear end portion thereof, a support portion that supports the conduction member,
    the conduction member includes a first flat surface portion, a second flat surface portion, and a convex portion, the first flat surface portion being formed in a plate-like shape and facing the one end side, the second flat surface portion facing the other end side and having a peripheral portion that makes contact with and moves away from the plurality of flat springs along with the movement of the core body portion, and the convex portion being formed in a central section of the first flat surface portion, protruding toward the core body portion, and coming into contact with the support portion, and
    the conduction member is arranged in a position, so that the second flat surface portion is positioned in parallel with an arrangement direction of the first flat spring and the second flat spring, and is formed to be able to swing, while using the convex portion as a point of support, so that the second flat surface portion is tilted with respect to the arrangement direction.

5. The position indicator according to claim 1, wherein each of the plurality of flat springs includes a contact portion that extends, in a direction orthogonal to the axial direction, from an end portion of the flat spring on the one end side, and is formed so as to come into contact with the conduction member.

6. The position indicator according to claim 5, further comprising
    an elastic member that is provided in the rear end portion of the core body portion and supports the conduction member from an opposite side to the plurality of flat springs.

7. The position indicator according to claim 5, wherein the plurality of flat springs include a first flat spring and a second flat spring,
    the core body portion includes, in the rear end portion thereof, a support portion that supports the conduction member,
    the conduction member includes a first flat surface portion, a second flat surface portion, and a convex portion, the first flat surface portion being formed in a plate-like shape and facing the one end side, the second flat surface portion facing the other end side and having a peripheral portion that makes contact with and moves away from the plurality of flat springs along with the movement of the core body portion, and the convex portion being formed in a central section of the first flat surface portion, protruding toward the core body portion, and coming into contact with the support portion, and
    the conduction member is arranged in a position, so that the second flat surface portion is positioned in parallel with an arrangement direction of the first flat spring and the second flat spring, and is formed to be able to swing, while using the convex portion as a point of support, so that the second flat surface portion is tilted with respect to the arrangement direction.

8. The position indicator according to claim 1, further comprising
    an elastic member that is provided in the rear end portion of the core body portion and supports the conduction member from an opposite side to the plurality of flat springs.

9. The position indicator according to claim 1, wherein the plurality of flat springs include a first flat spring and a second flat spring,
    the core body portion includes, in the rear end portion thereof, a support portion that supports the conduction member,
    the conduction member includes a first flat surface portion, a second flat surface portion, and a convex portion, the first flat surface portion being formed in a plate-like shape and facing the one end side, the second flat surface portion facing the other end side and having a peripheral portion that makes contact with and moves away from the plurality of flat springs along with the movement of the core body portion, and the convex portion being formed in a central section of the first flat surface portion, protruding toward the core body portion, and coming into contact with the support portion, and the conduction member is arranged in a position, so that the second flat surface portion is positioned in parallel with an arrangement direction of the first flat spring and the second flat spring, and is formed to be able to swing, while using the convex portion as a point of support, so that the second flat surface portion is tilted with respect to the arrangement direction.

\* \* \* \* \*